United States Patent [19]

Beck et al.

[11] Patent Number: 4,986,610
[45] Date of Patent: Jan. 22, 1991

[54] BRAKE SYSTEM WITH BRAKE SELECTION MEANS

[75] Inventors: Arnold A. Beck, Clinton; Edgar J. Ruof, Akron; John Nedelk, Massillon; Ralph J. Hurley, Mogadore; Steven R. Smithberger, North Canton, all of Ohio

[73] Assignee: Aircraft Braking Systems Corporation, Akron, Ohio

[21] Appl. No.: 380,324

[22] Filed: Jul. 17, 1989

Related U.S. Application Data

[63] Continuation-in-part of Ser. No. 312,994, Feb. 21, 1989, Pat. No. 4,923,056.

[51] Int. Cl.$^5$ .................................................. B60T 8/86
[52] U.S. Cl. ................................ 303/93; 188/106 P; 244/111; 303/9.61; 303/20; 303/92; 303/113; 303/111
[58] Field of Search ................ 303/93, 20, 7–8, 303/9.61, 9.63, 9.62, 92, 96, 98, 106, 100, 105, 102, 111, 1, 113; 244/111; 188/181 A, 181 T, 181 C, 181 R, 106 P, 106 A, 16, 354, 196 R, 71.1

[56] References Cited

U.S. PATENT DOCUMENTS

| | | | |
|---|---|---|---|
| 3,711,163 | 1/1973 | Booher | 303/93 |
| 3,920,204 | 11/1975 | Bissell et al. | 244/111 |
| 4,007,970 | 2/1977 | Romero | 303/93 |
| 4,022,513 | 5/1977 | Hirzel et al. | 303/93 |
| 4,120,540 | 10/1978 | Devlieg | 303/93 X |
| 4,260,199 | 4/1981 | Reinecke | 303/96 |
| 4,269,455 | 5/1981 | Beck et al. | 244/111 X |
| 4,404,633 | 9/1983 | Goicoechea | 303/93 X |
| 4,591,213 | 5/1986 | Rapoport | 244/111 X |
| 4,923,056 | 5/1990 | Nedelk | 244/111 X |

Primary Examiner—Douglas C. Butler
Attorney, Agent, or Firm—Renner, Kenner, Greive, Bobak, Taylor & Weber

[57] ABSTRACT

The invention is directed to a system for increasing and/or extending the operation service life of an aircraft brake disk stack by selectively limiting the number of brake assemblies which comprise the aircraft landing gear configuration and which are put into operation during the time the aircraft is on the ground and subject to low speed taxi braking cycles while also providing that all of the brake assemblies of the total available on the aircraft are operational during other portions of the landing and takeoff cycle of the aircraft.

17 Claims, 4 Drawing Sheets

BRAKE SYSTEM WITH BRAKE SELECTION MEANS

CROSS REFERENCE TO RELATED APPLICATIONS

This is a continuation-in-part of co-pending patent application Ser. No. 312,994, filed Feb. 21, 1989, for METHOD OF INCREASING THE SERVICE LIFE OF AIRCRAFT CARBON DISC BRAKES, now U.S. Pat. No. 4,923,056.

TECHNICAL FIELD

The invention herein resides in the art of braking systems and, more particularly, to braking systems for aircraft. Specifically, the invention provides an apparatus and technique for mutually exclusively enabling alternate pairs of brakes for actuation during taxiing.

This invention generally pertains to aircraft brakes and more particularly to multiple brake configurations as may be found on commercial and/or military transport aircraft. More specifically, the invention provides a method for increasing the service life of aircraft heat sinks (commonly called disc stacks) and especially carbon heat sinks as used in multi-disk brake assemblies of large aircraft.

While considerable attention has been given to the design of aircraft brake assemblies, brake service life is primarily determined by the number of landing cycles to which such brake assemblies are subjected. For example, a particular brake disk stack may be functional for two thousand landing cycles before it must be taken out of service and inspected for wear. At this point in the brake life, the disk components will probably be completely replaced with new disks.

The replacement and/or refurbishment of brake heat sinks and associated maintenance actions represent a most significant portion of continuing operating costs for commercial and/or military aircraft operators.

To minimize brake operating costs as much as possible, operators have increasingly required longer life brake heat sinks to be provided, thus reducing brake replacement part costs as well as maintenance actions required.

Steel brake technology has been able to provide reasonably long brake life in the past. However, the newer carbon brakes have more than doubled the brake life potential on the large transport aircraft. While these new carbon brakes provide greater operating life, thus reducing maintenance cost, their part cost is significantly higher than their steel counterparts. Thus, their actual overall operational cost remains higher overall.

Brake life is determined by the functional operation of the aircraft during a normal takeoff and landing cycle which usually consists of taxi snubs, taxi stops, takeoff roll, flight, landing stop, taxi snubs and taxi stops.

Brake wear occurs during taxi snub, taxi stop, and landing stop portions of the cycle both prior to takeoff and again after landing.

While it would seem to the casual observer that the greatest brake wear occurs during the high-speed landing portion of a typical service cycle, a larger proportion of brake wear actually occurs prior to take-off and after landing when the aircraft experiences numerous taxi stops and snubs. These taxi-snub cycles are more prevalent because of the increase traffic and taxi way lengths at congested airports from which these aircraft operate.

It has been found that braking during taxi operations can use a significant majority of the total available brake wear, especially with carbon brakes, which actually wear at a higher rate during taxi operation than during normal service landings.

Thus, it is proposed that overall brake life can be significantly extended by utilizing only a portion of the available number of brakes during normal taxi operations, thus maximizing the life of all of the brakes. All available brakes, of course, must work for normal landing, rejected takeoff stop, or in any emergency stopping situation.

This invention embodies a "taxi select" design feature which in effect allows utilization of only certain sets of brakes, depending on aircraft type, during low speed taxi operations.

This feature will allow a much greater brake life to occur since any one brake will be subjected to only one half or less as many taxi cycles as before.

Absent in the prior art is an apparatus or a method which alternates taxiing braking activity between sets of brakes, thereby increasing brake life significantly as well as the length of time between major brake overhauls when the disks of the brake disc stack are sufficiently worn and must be replaced.

DISCLOSURE OF INVENTION

In light of the forgoing, a first aspect of the invention is the provision of an aircraft brake system in which alternate sets of brakes are employed in sequential taxiing operations.

Another aspect of the invention is the provision of an aircraft brake system in which less than a full complement of brakes is employed when aircraft speed is below a particular level.

A further aspect of the invention is the provision of an aircraft brake system in which less than a full complement of brakes may be employed in taxiing operations, but only in the absence of antiskid activity.

Yet an additional aspect of the invention is the provision of an aircraft brake system for actuating select sets of brakes during taxiing which may be readily implemented with existing aircraft employing state-of-the-art techniques and apparatus.

The forgoing and other aspects of the invention which will become apparent as the detailed description proceeds are achieved by a brake system for a vehicle, comprising: first and second sets of brakes associated with respective sets of wheels of the vehicle; operator controlled brake activation means interconnected with said first and second sets of brakes for allowing an operator to regulate application and release of brake pressure at said brakes; wheel speed sensing means associated with said wheels for producing a wheel speed signal indicative of instantaneous speed of the vehicle; and brake selection means interconnected between said first and second sets of brakes and said wheel speed sensing means for enabling said first set of brakes and inhibiting said second set of brakes when said speed of the vehicle is below said first predetermined threshold speed.

Other aspects of the invention are achieved by a brake control system for an aircraft, comprising: first and second sets of brakes associated with respective sets of wheels of the aircraft, said brakes having associated brake valves for application and release of brake pressure; operator actuated brake pedal means interconnected with said brake valves for controlling a metering of brake pressure from said brake valves to said brakes; antiskid control means interposed between said brake valves and said brakes for selectively controlling application of brake pressure to said brakes from said brake valves as a function of braking activity of associated wheels; and brake selection means interconnected with said first and second sets of brakes for mutually exclusively enabling one of said sets of brakes for braking operation on the occurrence of predetermined events.

DESCRIPTION OF THE DRAWINGS

For a complete understanding of the invention, reference should be made to the following detailed description and the accompanying drawings wherein.

DETAILED DESCRIPTION OF THE INVENTION

This invention is directed to a method and apparatus for increasing and/or extending the operation service life of a brake disk stack, the disk stack comprised of a plurality of carbon disk frictional braking elements. The service life is the period of operation beginning with that point in time when a particular brake is put into service and ending when the disk stack must be replaced by a new disk stack. The brake disk stack is an integral and functional important part of a brake assembly, there being a plurality of such brake assemblies each associated with a respective wheel and forming the total landing gear configuration as may be mounted on a particular aircraft. Large airliners of the type alluded to, whether jet type or otherwise, have at least four or as many as sixteen or more such brake assemblies and these are mounted in association with respective wheels.

Generally, the method of the present invention comprises selectively limiting the number of brake assemblies of the total available on the aircraft landing gear which are put into operation during the time the aircraft is on the ground and subject to low speed taxi snub and taxi stop braking cycles. This is accomplished while also providing that all of the brakes of the available total number of brakes are rendered operational for normal braking, i.e., during landing of the aircraft or for rejected take-offs.

Figure 1:
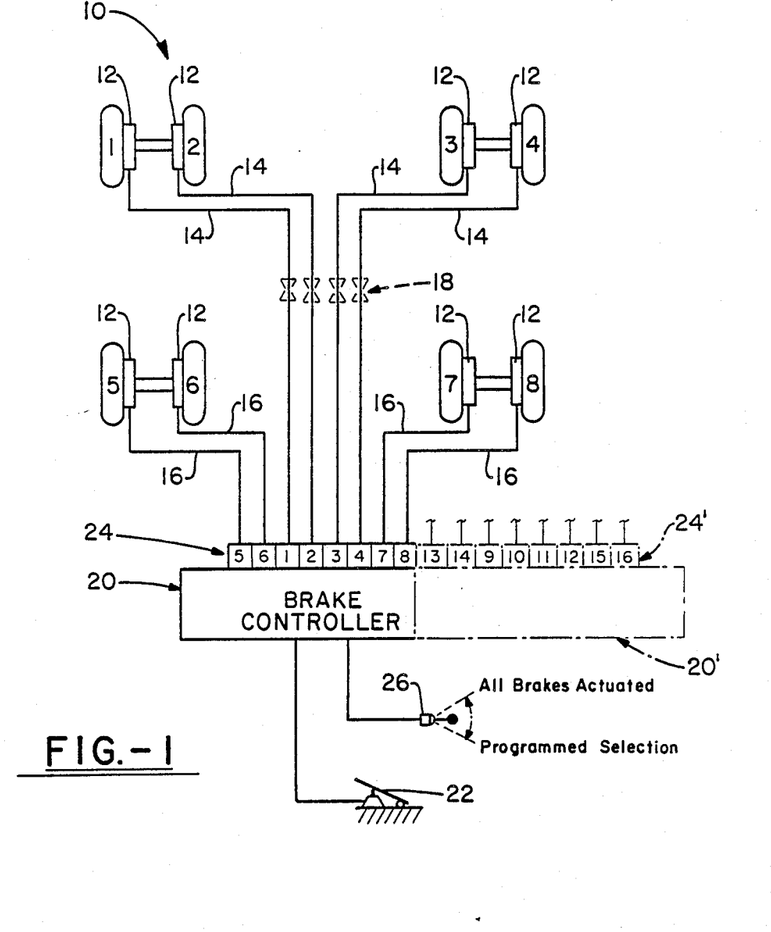
FIG. 1 is a diagrammatic plan view of alternate embodiments of the invention.

The method of the present invention may be accomplished in various ways which will become apparent to those persons knowledgeable in this art, however, only representative examples will be described in detail. Referring to the drawings, a first embodiment of the invention is shown in FIG. 1. Here, an eight-wheel landing gear arrangement is diagrammatically illustrated in solid lines and generally indicated by reference numeral 10. The wheels of the landing gear are indicated by numerals 1-8 and each of these include an associated and identical brake assembly 12. The brake assemblies 12 are of the multi-disk, brake-disk stack type and may be either hydraulically actuated or electrically actuated, the type of actuation not being an important consideration in the practice of the invention. For example, if hydraulically actuated, the feed lines 14 for the brake assemblies 12 of wheels 1-4 will be hydraulic fluid conduits and, if electrically actuated, the feed lines 14 will comprise electrical lines. The same is true of the feed lines 16 associated with brake assemblies 12 of wheels 5-8. In either case, whether hydraulically or electrically actuated, the brake system 10 is operated by a brake controller 20 in communication also with a pilot's brake actuation pedal 22.

According to a first example of the invention, one may install one-way check valves shown in ghost and indicated generally at 18 in the circuitry of a first group of brake assemblies. In this example the first group will comprise the brake assemblies 12 of wheels 1-4 and the check valves 18 will be set to a predetermined pressure threshold which is established for a particular aircraft and braking system. The brake assemblies 12 of wheels 1-4 therefore will only be actuated at pressures above the threshold value. The remaining brake assemblies 12 associated with wheels 5-8 do not have check valves in their circuitry and therefore these brake assemblies will be actuated at all pressures. Because the taxi braking cycles typically operate with low pressures, the brakes of wheels 5-8 which do not have check valves 18 will be operational during this type braking. Thus, by a proper selection of the threshold pressure for check valves 18, the taxi-snub braking will be handled by less than the full complement of brake assemblies 12. In this example, while brake assemblies 12 for the wheels 5-8 will be actuated for all braking requirements of the aircraft, the brake assemblies 12 for the wheels 1-4 will only be actuated for braking above the threshold value of the valves 18. It should be appreciated from this example that the carbon disk elements of the brake assemblies 12 associated with wheels 1-4 will exhibit a longer operational service life over the brake assemblies for wheels 5-8 and also longer than if all the brakes were operational at all speeds.

While the above described method will result in significantly extending the service life of one group of brake assemblies of a total complement of brake assemblies, a more efficient and preferred method is possible. Referring again to FIG. 1, and eliminating the check valves 18 from the brake circuitry, the present method includes a plurality of switch or valve means indicated at 24, each one associated with a respective brake assembly 12 of the wheels 1-8. The switch or valve means 24 are controlled by the brake controller 20 which may be programmed to actuate various of the brake assemblies in accordance with a predetermined sequence. For example, brake assemblies 12 associated with wheels 1, 2, 3 and 4 may be programmed to be actuated for a first taxi stop. A second subsequent taxi stop will use brake assemblies 12 of wheels 5, 6, 7 and 8. By repeating this cyclic operation for subsequent taxi stops prior to take-off or after landing, the total taxi brake wear is reduced approximately 50% as compared to the situation wherein all of the brakes are actuated each and every taxi stop. In addition, the brake disk wear is evened out over all of the brakes of a particular landing gear arrangement. Once the aircraft is airborne, the controller 20 reverts to an all-brake actuation sequence which is necessary when the aircraft comes in for a landing. This may be accomplished automatically by switch 26 associated with the landing gear such that when the landing gear is raised after "take-off" the brake controller 20 reverts to an all-brake complement condition in preparation for a landing. Alternatively, the switch 26 may be a pilot-controller switch allowing the pilot to manually select the type of braking action established in the brake controller 20. From the above description, it can be appreciated that the controller 20 may select any combination of brake actuation dependent upon the program selection. For example, instead of alternating taxi-snub braking cycles between groups of brake assemblies including a first group associated with wheels 1–4 and a second group associated with wheels 5–8 as suggested above, the first group may be programmed to comprise brake assemblies associated with wheels 2, 3, 6 and 7 while the second group may comprise assemblies associated with wheels 1, 3, 5 and 8. Alternatively, and this will depend upon the type of aircraft, the programmed selection may only comprise brake assemblies associated with two wheels such as for example wheels 1 and 4, or 2 and 3, or 6 and 7, or 5 and 8. Of course, in an aircraft landing gear comprised of a four-wheel configuration the brake pre-selection is obviously limited to a two-of-four selection for balanced braking of the wheels.

It will, of course, be recognized by those skilled in the art that the drawing may as well be illustrative of one-half of a sixteen-wheel landing gear arrangement, the opposite eight wheels (not shown) being identically arranged. Of course, it is not material to this invention where the actual landing gears are mounted on the aircraft as some are mounted under the wings while others are mounted to the fuselage. In any event, the brake controller 20 and switch means 24 may be expanded as indicated at 20' and 24' respectively to cover any landing gear arrangement whether for 2, 4, 8, 16 or more wheels and associated brake assemblies. Obviously, as the number of brake assemblies increases, so does the number of possible combinations for taxi braking pre-selection. Therefore, this invention is not considered limited in any way to any particular number of wheels of a landing gear arrangement which may be preselected for taxi braking or the particular sequence that such wheels are preselected. In all cases, the total number of wheels is always used in aircraft landing situation.

Figure 2:
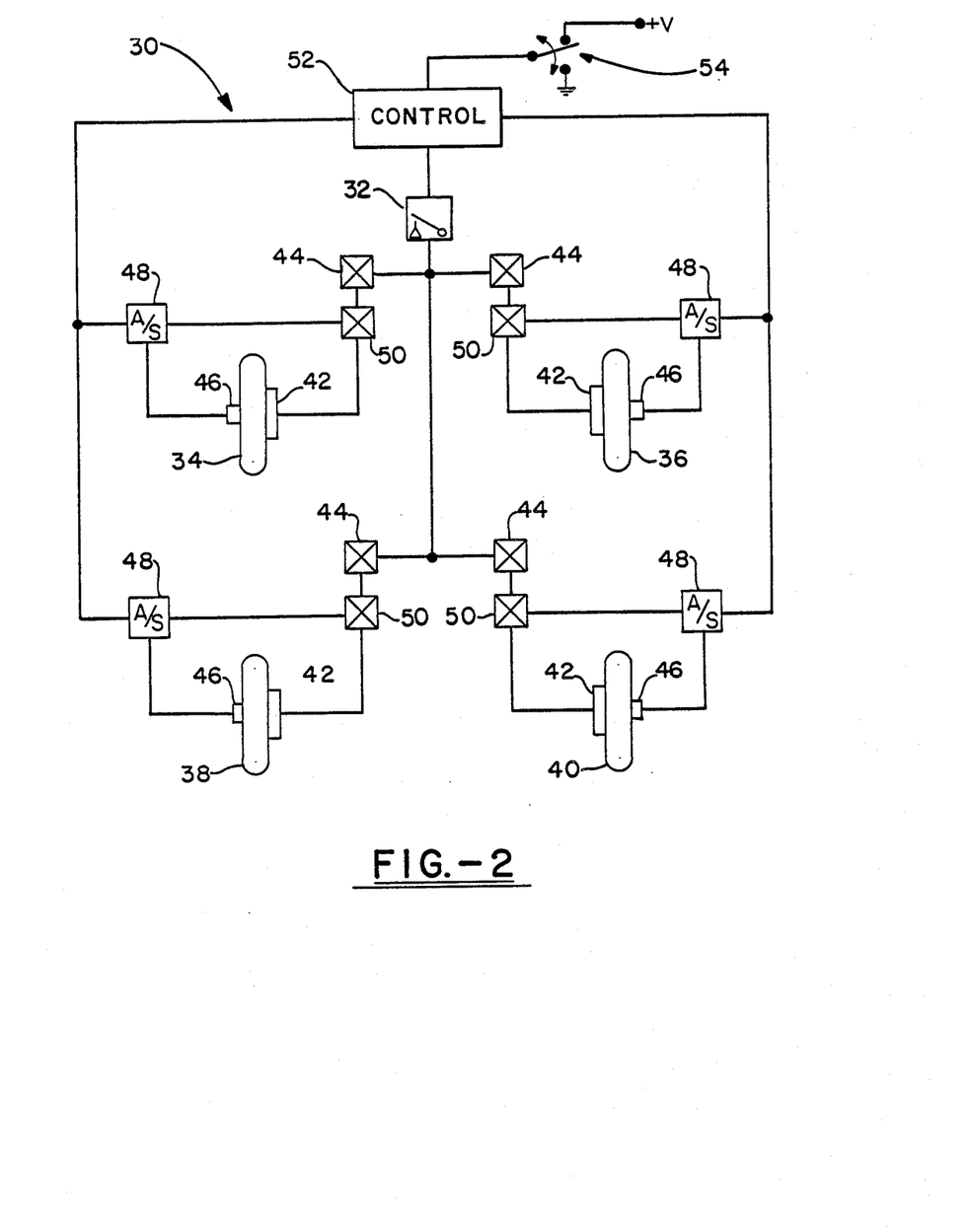
FIG. 2 is a diagrammatic plan view of yet another embodiment of the invention.

With reference now to FIG. 2, it can be seen that another brake control system according to invention is designated generally by the numeral 30. A pilot-controlled brake actuation pedal 32 is provided to allow the pilot to regulate, in the first instance, the application and release of brake pressure. Typically, the pedal 32 will comprise a pair of pedals, one each for the left and right sides of the aircraft. It will be appreciated by those skilled in the art that the brake pedal 32 may either directly control the metering of hydraulic fluid to the brakes, or the pedal may generate an electric control signal which is in turn applied to a metering valve for such purpose. In either event, the pedal 32 seeks to control the braking action at the wheels 34–40, each having associated therewith a brake disk assembly as is commonly used in the art. Associated with each of brake disk assemblies 42 is a brake pressure metering valve 44 controlled hydraulically or electrically by the pedal 32 to meter brake pressure to the brake disk stack of the associated assemblies 42.

A wheel speed transducer 46 is associated with each of the wheels 34–40 to generate an electrical signal having a frequency corresponding to the instantaneous speed of the associated wheel. The outputs of each of the transducers 46 are passed through an associated antiskid control circuit 48 which monitors the braking activity of the associated wheel and brake disk assembly. Antiskid control circuits are well known to those skilled in the art and only a general understanding of the operation of the same is necessary for an appreciation of the invention herein. Employing basic control circuit techniques, the antiskid control circuit monitors the braking activity at the associated wheel by monitoring the wheel speed signal of the transducer 46 and assures optimum braking activity by either inhibiting or immediately responding to the occurrence of skids at the associated wheel, seeking to cause the braking activity of the aircraft to operate near the peak of the mu-slip curve. Typically, the antiskid circuit will apply proportional, integral, and derivative (PID) techniques to not only sense actual skids but also anticipate skids before they occur. Appropriate output signals from the antiskid circuit 48 may be applied to an associated antiskid valve 50 interposed between the brake valve 44 and the brake assembly 42. The antiskid valve 50 effectively overrides the brake valves 44 in the event of antiskid activity to either release or dump the brake pressure as a function of the skid which is occurring or anticipated, and then allows the reapplication of brake pressure at a level which will be supported by the existing coefficient of friction between the associated wheel and the runway. Accordingly, irrespective of the brake pressure requested by the pilot through the pedal 32, only that pressure which will be supported by the existing runway friction coefficient will be supplied.

It will be further appreciated by those skilled in the art that the antiskid circuits 48 may either comprise discreet components of differentiators, integrators, comparators, and the like, or may comprise a microprocessor so configured and programmed to perform the necessary functions.

A control circuit 52, typically a programmed microprocessor, is provided in association with the brake control system 30. The control circuit 52 communicates with each of the antiskid circuit boards 48, the pedal 32, a squat switch 54, and each of the valves 44 and/or 50. As is known in the art, the squat switch 54 is activated when the landing gear is deployed in preparation for landing and, upon such deployment, generates a signal to the control circuit 52 which assures a full dump of brake pressure through the valves 44 and/or 50 to assure a full dump of brake pressure upon landing. Only after the wheels have spun up to landing speed is the dump released such that brake pressure can then be applied. Associated with each of the wheels and braking assemblies 34–42 is built in test equipment (BITE) to monitor the operational ability of the associated antiskid control circuit 48. The BITE board may be physically maintained on the associated antiskid board 48 or may be part and partial of the control circuit 52. In any event, it is well known in the art that such BITE systems are employed to exercise the antiskid system prior to landing and, if an error is found in the antiskid system, to inhibit the operation of that system during the landing operation. It is also known that the BITE system may actually monitor the antiskid system during the landing operation and inhibit its function if an error is found at that time.

The control circuit 52 also functions to control the selective operation of alternate sets of the brake assemblies 42 during taxiing operations. The technique and structure for such control is shown in the flow chart of FIG. 3. As shown, the taxi brake select operation is possible only if a number of criteria respecting aircraft speed, braking activity, and pilot operations are satisfied. Initially, the control circuit 52 determines whether or not the antiskid circuits 48 are operating to control the antiskid valves 50. This is achieved by monitoring the control voltage of the associated antiskid circuit 48 which controls the valve 50. If the antiskid control voltage $V_{as}$ is greater than a first threshold T1, it is determined that the antiskid system is operating. In such an event, all brakes are employed and the taxi brake selection is rendered inoperative. A determination is also made as to whether or not the antiskid system 48 has experienced failure. This is achieved through the BITE system. If the antiskid system has failed, then the taxi brake select function is inhibited.

Figure 3:
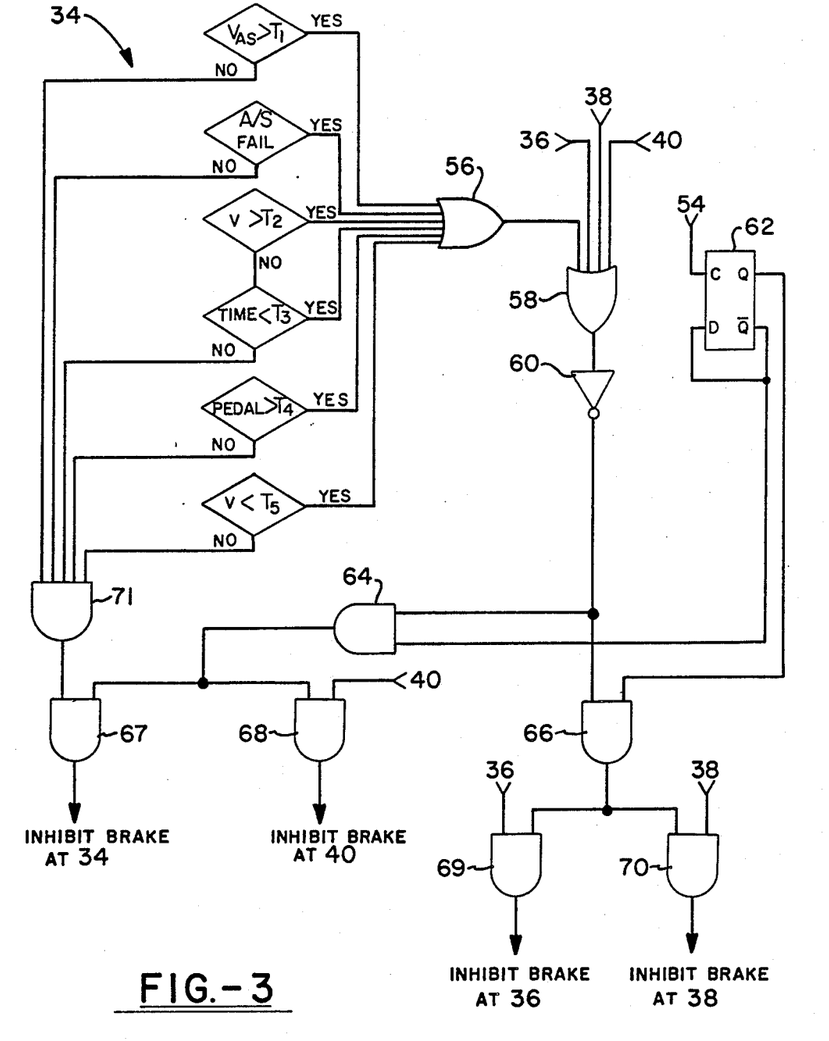
FIG. 3 is a procedural flow chart of the operation of the embodiment of FIG. 2.

To engage the taxi brake select feature, a determination must also be made as to the velocity of the aircraft. As its name implies, the taxi brake select feature will be employed only during taxiing operations, when the aircraft speed is below a particular threshold level T2. At higher speeds, all the brakes are necessary to achieve the desired braking operation. Accordingly, if the vehicle speed is greater than the threshold T2 the taxi brake select function will be inhibited. It should now be appreciated that the velocity can be sensed from the wheel speed transducer 46 associated with the wheel of interest, or it could be sensed off of an unbraked wheel such as a nose wheel. It will also be appreciated that the threshold T2 will be tailored to satisfy the parameters of the aircraft and braking system of interest. A typical speed would be on the order of 50 knots.

To assure that the monitored wheel speed is indicative of the fact that the aircraft is actually taxiing and not as a result of braking operations, a time function is employed. Once the aircraft velocity or associated wheel velocity drops below T2, the control circuit 52 initiates a clock. The velocity must remain below T2 for a predetermined amount of time T3, before the taxi brake select function is allowed. Only when the velocity is below the threshold T2 for a period of time T3, is the determination made that an actual taxiing operation has been entered.

The control circuit 52 also monitors the depression of the pedal 32. A linear variable differential transformer or other suitable switch or device may be associated with the pedal 32 for this purpose. If the depression of the pedal 32 exceeds a particular threshold T4, it is indicative of the fact that the pilot is seeking to obtain brake pressure greater than that desired in normal taxiing operations and, in such an event, the taxi brake select function is inhibited.

Finally, a determination is also made as to whether the aircraft speed is below a low threshold T5, indicating that the aircraft is nearing a complete stop, in which case it is desired that all of the brakes be available for the braking operation and for parking. Again, the threshold T5 may be tailored to the specific aircraft and braking system, but may typically be on the order of 8 knots. If the aircraft velocity is below the threshold level T5, the taxi brake select function is inhibited.

In the event that taxi brake select is in operation and a condition occurs which causes reversion to full braking, the additional brakes will be applied gradually so as to preclude any sudden change in deceleration of the aircraft.

The flow chart presented is undertaken for the braking system associated with each of the wheels 34–40. The flow chart actually shown in FIG. 3 is assumed, for purposes of description, to have been undertaken for the braking system of the wheel 34 as indicated generally by the arrow. The outputs of the test are applied to the inputs of the OR gate 56. Accordingly, if any of the tests produced an indication that the taxi brake selection function was to be inhibited, a logic "1" would be apparent at the associated input of the OR gate 56 and, accordingly, the output of the gate 56 would similarly be a logic "1". Similar tests are performed for the brake systems associated with each of the remaining wheel assemblies 36–40 and the outputs of the associated OR gates, corresponding to the OR gate 56, are provided to the OR gate 58. Accordingly, if any of the brake systems associated with the wheels 34–40 indicate that the taxi brake select function is inappropriate, a logic "1" will appear at the output of the OR gate 58. In like manner, if the appropriate tests are satisfied by the braking systems associated with said wheels, a logic "0" is evidenced at that output. In either event, the output is inverted by the invertor 60 such that the output of the invertor is a logic "1" if taxi brake select is appropriate, and a logic "0" if it is inappropriate. The output is applied to inputs of AND gates 64–66 as shown. Accordingly, if taxi brake select is inappropriate, as evidenced by a logic "0" at these inputs of the AND gates 64–66, such gates are inhibited, evidencing a logic "0" on the outputs thereof. If, however, taxi brake select is appropriate, a logic "1" is presented at these inputs of the AND gates 64, 66, enabling the same to pass to the outputs thereof the signals present on the other inputs.

A flip-flop 62 provides the other inputs to the AND gates 64, 66. The flip-flop 62 is clocked by the squat switch 54 such that, upon each landing, the flip-flop 62 changes state. Accordingly, the true (Q) and the complimentary (Q̄) outputs are the logic inverse of each other and toggle or change state on each landing. Accordingly, on a first landing the flip-flop 62 may provide a logic "1" input to the AND gate 64 and logic "0" input to the AND gate 66. On the next landing, toggling of the flip-flop 62 will cause a logic "0" to be presented at the input of the AND gate 64 and a logic "1" to be present at the corresponding input of the AND gate 66. As a consequence, if taxi brake select is appropriate as indicated by a logic "1" from the output of the invertor 60, one of the AND gates 64 will present a logic 1 output, and the other a logic "0" output. If, however, the output of the invertor 60 is a logic "0," the output of both AND gates 64, 66 will be a logic "0".

The outputs of AND gates 64, 66 pass to inputs of respectively associated pairs of AND gates 67, 68 and 69, 70. Provided as another input to the AND gate 67 is the output of AND gate 71 which is a logic "1" only if the braking system of wheel 34 satisfies all of the criteria of the flow chart as shown. Other inputs to AND gates 68, 69, 70 are provided from AND gates corresponding to the gate 71 respectively associated with the wheels 40, 36, 38. The outputs of the AND gates 67–70 may be connected directly to the associated antiskid control circuit 48 to dump pressure of the inhibited brakes ira the associated antiskid valve 50, or the outputs may pass to the controller 52 which in turn performs such functions. In any event, upon subsequent landings, alternating sets of brakes are caused to perform the taxi braking operation.

It will be appreciated that, with the structure and technique presented with respect to FIGS. 2 and 3, the actuated brakes are paired to achieve smooth braking operation. For example, the wheels 34, 40 are respectively fore left and aft right wheels, which are allowed to brake together. Similarly, the wheels 36, 38 are respectively fore right and aft left wheels which are allowed to brake together. The concept of the invention could be applied to aircraft in which pairs of wheels are maintained on common struts, with inboard or outboard wheels being so paired.

It will further be appreciated that inhibiting of the brakes during taxiing may be readily achieved by the antiskid control dumping brake pressure at the appropriate antiskid valves 50.

It can thus be seen that the structure of FIGS. 2 and 3 allows for implementation of one half of the brakes of the aircraft during a taxiing operation on a first landing, and by a second half of the brake assemblies on a subsequent landing. The selection of the brakes for taxiing operations is switched by the flip-flop 62 and squat switch or landing gear switch 54 from one landing to the next such that all of the brakes of the aircraft will wear equally, optimizing brake wear, and minimizing the frequency of replacement of brake disks.

Figure 4:
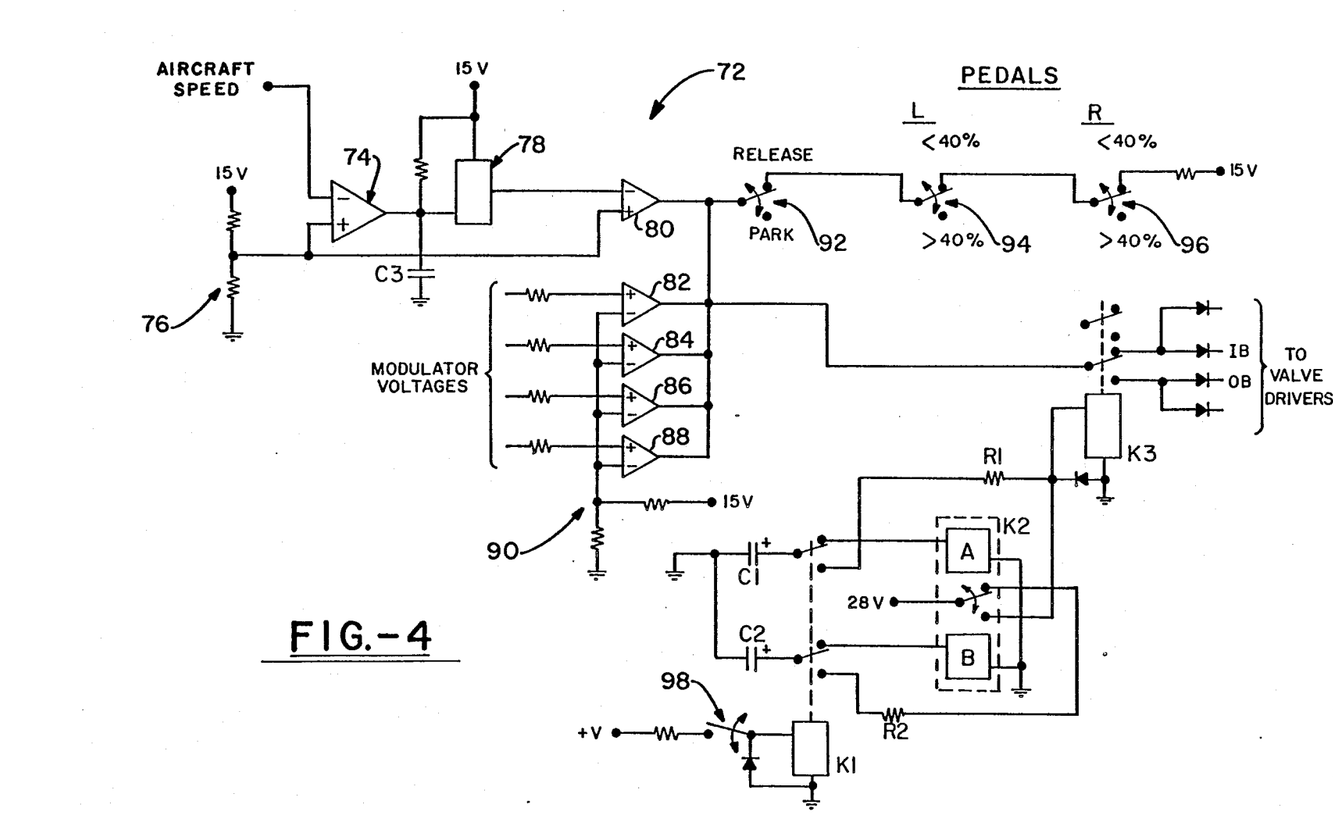
FIG. 4 is a functional block diagram of still another embodiment of the invention.

The structure and technique just described is easily implemented with presently existing digital braking systems. An embodiment of this concept for implementation with analog systems is shown in FIG. 4, wherein the brake system is designated generally by the numeral 72. Here, the aircraft speed, determined from a freewheeling wheel or other appropriate source, is applied to a comparator 74 at which it is compared against a speed threshold level set by the voltage divider 76. When the aircraft speed drops below the threshold speed, and output from the comparator 74 actuates a timer 78 which is set to time out after a preselected time period. Should the aircraft speed rise above the threshold of the voltage divider 76 before the timer 78 times out, the output of the comparator 74 switches and the timer 78 is discharged such that it can start anew when the aircraft speed again drops below the threshold level. Accordingly, if the aircraft speed is below the threshold level for the period of time characteristic of the timer 78, a logic "0" is applied to the input of the comparator 80. Such that the output of the comparator 80 is at a logic "1" after the aircraft speed has been below a threshold level for sufficient period of time to indicate a taxiing condition. Consequently, the comparator 80 appears as an open circuit.

As shown in FIG. 4, the braking system depicted employs four antiskid valves, one on each of four wheels. The modulator voltage of each of the antiskid controls for each of the wheels is appropriately connected to respective comparators 82, 88, the negative inputs of which are connected to a voltage divider 90 which sets a threshold input indicative of antiskid activity of any of the associated antiskid circuits. If the positive input of any of the comparators 80-88 receives a signal greater than the threshold set by the voltage divider 90, such signal is indicative of the fact that the associated antiskid valve is functioning, placing a logic "0" at the common output thereof. Only if all of the antiskid valves are inactive will a logic "1" be presented at the common output by the associated comparator 82-88. Thus, the common output will show a logic "1" only if the aircraft speed has been below the threshold level for a specific time period, as determined by the comparator 80, and if the antiskid voltages are inactive, as established by the comparators 82-88. This signal, whether a "1" or a "0" is then passed through a succession of switches to the valve drivers of the associated brakes to either achieve operation of all brakes for normal operation, or of half of the brakes for taxiing operation.

A switch 92 is provided in conjuction with the park brake of the aircraft. If the park brake is on, the switch 92 is open, preventing the signals from the comparators 82-88 to transfer to the brake valves. Accordingly, full brake pressure of all brakes can be applied in the parked condition. If the park switch is released, the switch 92 is closed and the signal may then pass to the switch 94 which monitors the position of the brake pedal. In the event that the left brake pedal is depressed greater than a predetermined amount, indicative that taxiing opertions are not being employed, the switch 94 is open and the signal can pass no further. If, however, the left pedal is depressed less than the threshold amount, the switch 94 is closed, allowing the signal to pass. A switch 96 is associated with the right brake pedal and functions similarly to that of the switch 94. If the right brake pedal is depressed beyond the threshold level, the switch 96 is open, preventing the transfer for any signals. If the depression of the right brake pedal is less than the threshold amount, the switch 96 is closed, allowing passage of the signals.

If the switches 92-96 are closed, indicating that taxi brake select is appropriate, the output of the comparators 82-88 are passed to the selected contacts of the relay K3 to apply the output of the comparators 82-88 to the valve driver selected by the relay K3. As illustrated, the relay K3 is operative to mutually exclusively interconnect this signal with one half of the valve drivers or the other half of the valve drivers. The selection of valve drivers will be discussed below. At this time, suffice it to say that a logic one, indicating taxiing activity, will dump the brake pressure at the interconnected valves. Those valves not selected will remain for normal operation. A logic zero will not cause such a dumping, but will allow the selected brakes to operate nomrally. Accordingly, the relay K3 accesses one half of the brake valve drivers at a time and then, dependent upon the incoming signal, dumps the pressure at those brakes for taxiing operations, or allows the brakes to operate normally for regular braking operations.

As with the prior embodiment, half of the brake valves are selected during a first landing operation, and the other half are selected during a subsequent landing operation to assure that equal braking activity is experienced by all the brakes. To this end, relays K1 and K2 act to change the state of the relay K3 each time the landing gear is lowered, so that inboard brakes are dumped during taxiing for one landing, and outboard breaks are dumped for taxiing during the next landing, and so forth. The relay K2 is a magnetic latching relay, the state of which depends upon which of its two coils was last energized. The relay K1 is a double-pole double-throw relay that is energized while the landing gear is up. As illustrated in FIG. 4, coil A of relay K2 was the last coil energized and the contacts are shown diverting a supply voltage from the coil K3. This supply voltage is directed to resistor R2, but cannot reach capacitor C2 because relay K1 is de-energized. After take-off while the landing gear is retracted, relay K1 becomes energized and capacitor C2 becomes charged, but relay K2 and K3 do not change. When relay K1 de-energizes, by actuation of the landing gear switch 98, the charged capacitor C2 causes relay K2 to change state by momentarily energizing coil B of relay K2. Relay K3 then energizes and remains energized because relay K2 has then latched toward coil B. The source voltage is also now available through resistor R1, but cannot reach capacitor C1 because relay K1 is de-energized. At the next gear retraction, capacitor C1 will become charged and when the gear is later lowered for a subsequent landing, capacitor C1 will cause relay K2 to return to the original condition shown in FIG. 4.

It should now be appreciated that FIG. 4 illustrates an analog system for taxi brake control. Landing gear actuation alternately selects between paired halves of the total brake system of the aircraft. When the circuitry of FIG. 4 determines that taxiing operations are being employed, brake pressure at those brakes selected by the relays K1-K3 are dumped such that the brakes are inactive. The remaining one-half of the full complement of brakes performs the braking operation. Accordingly, all of the brakes wear at substantially the same rate such that service intervals and effectiveness will be maximized.

Thus it can be seen that the objects of the invention have been satisfied by the structures and techniques presented above. While in accordance with the patent statutes only the best modes and perferred embodiments of the invention ahave been presented and described in detail, it is to be understood that the invention is not limited thereto or thereby. Accordingly, for an appreciation of the true scope and breath of the invention reference should be made to the following claims.

We claim:

1. A brake system for a vehicle, comprising:
   first and second sets of brakes associated with respective sets of wheels of the vehicle;
   operator controlled brake actuation means interconnected with said first and second sets of brakes for allowing an operator to regulate application and release of brake pressure at said brakes;
   wheel speed sensing means associated with said wheels for producing a wheel speed signal indicative of instantaneous speed of the vehicle; and
   brake selection means interconnected between said first and second sets of brakes and said wheel speed sensing means for enabling said first set of brakes to receive said application and release of brake pressure while inhibiting said second set of brakes from receiving said application and release of brake pressure when said speed of the vehicle is below a first predetermined threshold speed.

2. The brake system according to claim 1, futher timing means interconnected with said wheel speed sensing means and brake selection means, said timing means being actuated by said wheel speed sensing means when said speed of the vehicle is below said threshold speed, said timing means controlling said brake selection means to enable said first set of brakes and inhibit said second set of brakes when said speed of the vheicle is below said threshold speed for a predetermined period of time.

3. The brake system according to claim 2, further comprising sensing means interconnected between said brake actuation means and said brake selection means, said sensing means monitoring a degree of actuation of said brake actuation means and controlling said brake selection means to enable said first set of brakes and inhibit said second set of brakes when said degree of actuation is less than a pedetermined threshold level of actuation.

4. The brake system according to claim 3, wherein said wheel speed sensing means inhibits operation of said brake selection means when said speed of the vehicle is below a second predetermined threshold level.

5. The brake system according to claim 3, further comprising antiskid control means interposed between said brake actuation means and said sets of brakes, for regulating actuation and release of said brakes by an operator to optimize braking effectiveness.

6. The brake system according to claim 5, further comprising means for monitoring operation of said antiskid control means, and inhibiting said brake selection means during operation of said antiskid control means.

7. The brake system according to claim 6, wherein said means for monitoring operation of said antiskid control means further inhibits said brake selection means in the event of a failure of said antiskid control means.

8. The brake system according to claim 6, wherein said brake selection means alternates said enabling and inhibiting between said first and second sets of brakes on successive occurrences of a predetermined event.

9. The brake system according to claim 8, wherein the vehicle is an aircraft, and said predetermined event is a landing.

10. A brake control system for an aircraft, comprising:
    first and second sets of brakes associated with respective sets of wheels of the aircraft, said brakes having associated brake values for application and release of brake pressure;
    operator actuated brake pedal means interconnected with said brake valves for controlling a metering of brake pressure from said brake valves to said brakes;
    antiskid control means interposed between said brake valves and said brakes for selectively controlling application of brake pressure to said brakes from said brake valves as a function of braking activity of associated wheels; and
    brake selection means interconnected with said first and second sets of brakes for enabling one of said sets of brakes for receiving said application and release of brake pressure for braking operation while inhibiting the other of said sets of brakes from receiving said application and release of brake pressure for braking operation on the occurrence of predetermined events.

11. The brake control system as recited in claim 10, wherein said brake selection means alternates said enabling and inhibiting of said first and second sets of brakes on sequential occurrences of said predetermined events.

12. The brake control system as recited in claim 10, wherein said brake selection means monitors depression of said pedal means and enables one of said sets of brakes only when said depression of said pedal means exceeds a predetermined threshold.

13. The brake control system as recited in claim 12, wherein said brake selection means monitors a travel speed of said aircraft and enables one of said sets of brakes only when said travel speed is less than a first threshold speed.

14. The brake control system as recited in claim 13, wherein said brake selection means enables one of said sets of brakes only when said travel speed is greater than a second threshold speed.

15. The brake control system as recited in claim 12, wherein said brake selection means enables one of said sets of brakes only when said travel speed is less than said first threshold speed for a predetermined period of time.

16. The brake control system as recited in claim 12, wherein said brake selection means monitors said antiskid control means and precludes said enabling of one of said sets of brakes while inhibiting said other of said sets of brakes during operation of said antiskid control means.

17. The brake control system as recited in claim 15, wherein said brake selection means precludes said enabling of one of said sets of brakes while inhibiting said other of said set of brakes should said antiskid control means fail.

* * * * *